(12) United States Patent
Jiang et al.

(10) Patent No.: US 12,335,799 B2
(45) Date of Patent: Jun. 17, 2025

(54) METHOD AND DEVICE IN FIRST NODE AND SECOND NODE FOR WIRELESS COMMUNICATION

(71) Applicant: BUNKER HILL TECHNOLOGIES LLC, Allen, TX (US)

(72) Inventors: Qi Jiang, Shanghai (CN); Xiaobo Zhang, Shanghai (CN); Lin Yang, Shanghai (CN)

(73) Assignee: BUNKER HILL TECHNOLOGIES LLC, Allen, TX (US)

( * ) Notice: Subject to any disclaimer, the term of this patent is extended or adjusted under 35 U.S.C. 154(b) by 2 days.

(21) Appl. No.: 17/023,384

(22) Filed: Sep. 17, 2020

(65) Prior Publication Data

US 2021/0007020 A1 Jan. 7, 2021

Related U.S. Application Data

(63) Continuation of application No. PCT/CN2019/095956, filed on Jul. 15, 2019.

(30) Foreign Application Priority Data

Jul. 31, 2018 (CN) .......................... 201810857518.5

(51) Int. Cl.
*H04W 36/00* (2009.01)
*H04L 1/00* (2006.01)
(Continued)

(52) U.S. Cl.
CPC ....... *H04W 36/0061* (2013.01); *H04L 1/0003* (2013.01); *H04L 1/0061* (2013.01);
(Continued)

(58) Field of Classification Search
None
See application file for complete search history.

(56) References Cited

U.S. PATENT DOCUMENTS

2016/0338014 A1* 11/2016 Zhang ................. H04W 4/70
2017/0208616 A1* 7/2017 Panteleev ......... H04W 72/1263
(Continued)

FOREIGN PATENT DOCUMENTS

CN 104380647 A 2/2015
CN 106063352 A 10/2016
(Continued)

OTHER PUBLICATIONS

ISR in application PCT/CN2019/095956 dated Sep. 30, 2019.
(Continued)

*Primary Examiner* — Yemane Mesfin
*Assistant Examiner* — Jeff Banthrongsack
(74) *Attorney, Agent, or Firm* — Ascenda Law Group, PC

(57) ABSTRACT

A method and a device for wireless communication. A first node receives a first radio signal indicating a second index, transmits a first signaling, and then transmits a second radio signal. A first index and the second index are used for generating the first signaling and the second radio signal, respectively. The first signaling is unrelated to the second index and the first signaling includes configuration information for the second radio signal. Through establishing relationships between the first index and the first signaling and between the second index and the second radio signal respectively, the efficiency of transmission of data and corresponding feedback between terminals in Internet of Things (IoT) and Vehicle-to-Everything (V2X) systems are improved, thereby improving the spectrum efficiency and flexibility of systems.

12 Claims, 12 Drawing Sheets

(51) Int. Cl.
  *H04L 1/18* (2023.01)
  *H04L 1/1812* (2023.01)
  *H04L 5/00* (2006.01)
  *H04W 72/04* (2023.01)
  *H04W 72/044* (2023.01)

(52) U.S. Cl.
  CPC .......... *H04L 1/1819* (2013.01); *H04L 5/0051* (2013.01); *H04W 72/0466* (2013.01)

(56) References Cited

U.S. PATENT DOCUMENTS

| | | | |
|---|---|---|---|
| 2017/0215172 A1* | 7/2017 | Yang | H04L 27/2601 |
| 2018/0234977 A1* | 8/2018 | Yasukawa | H04W 48/16 |
| 2018/0352520 A1* | 12/2018 | Zhang | H04B 7/0695 |
| 2019/0254091 A1* | 8/2019 | Kim | H04L 5/0078 |

FOREIGN PATENT DOCUMENTS

| | | | | |
|---|---|---|---|---|
| CN | 106538023 A | | 3/2017 | |
| CN | 106793109 A | * | 5/2017 | .......... H04W 72/042 |
| CN | 107306417 A | | 10/2017 | |
| CN | 107439050 A | | 12/2017 | |
| CN | 107547177 A | | 1/2018 | |
| CN | 107592155 A | * | 1/2018 | |
| CN | 107852728 A | | 3/2018 | |
| EP | 3091805 A1 | * | 11/2016 | ............ H04W 72/02 |
| WO | 2015109543 A1 | | 7/2015 | |
| WO | 2016163972 A1 | | 10/2016 | |
| WO | 2018004323 A1 | | 1/2018 | |
| WO | WO-2018058418 A1 | * | 4/2018 | ........ H04W 56/0035 |

OTHER PUBLICATIONS

First Office Action received in application No. CN201810857518.5 dated Jul. 13, 2021.
First Search Report received in application No. CN201810857518.5 dated Jul. 1, 2021.
CN201810857518.5 Notification to Grant Patent Right for Invention dated Sep. 30, 2021.
Samsung "Control information needed for broadcast communication transmission/reception", 3GPP TSG RAN WG1 Meeting #78 R1-143076 Aug. 8, 2014.
ZTE "Control signaling for D2D broadcast communication",3GPP TSG RAN WG1 #76bis R1-141424 Mar. 21, 2014.
First Office Action of Chinese patent application No. CN202111209425.X dated Feb. 2, 2024.
First Search Report of Chinese patent application No. CN202111209425.X dated Jan. 31, 2024.

* cited by examiner

METHOD AND DEVICE IN FIRST NODE AND SECOND NODE FOR WIRELESS COMMUNICATION

CROSS REFERENCE TO RELATED APPLICATIONS

This application is a Continuation of International Application No. PCT/CN2019/095956, filed Jul. 15, 2019, and claims the priority benefit of Chinese Patent Application No. 201810857518.5, filed on Jul. 31, 2018, the full disclosure of which is incorporated herein by reference.

BACKGROUND

Technical Field

The disclosure relates to transmission methods and devices in wireless communication systems, and in particular to a communication method and device on sidelink in wireless communication.

Related Art

Application scenarios of future wireless communication systems are becoming increasingly diversified, and different application scenarios have different performance requirements on systems. In order to meet different performance requirements of various application scenarios, the $3^{rd}$ Generation Partner Project (3GPP) Radio Access Network (RAN) #72 plenary session decided to conduct the study of New Radio (NR) (or, Fifth Generation, 5G). The work item of NR was approved at the 3GPP RAN #75 session to standardize the NR.

In view of Vehicle-to-Everything (V2X) services developing rapidly, 3GPP has also started the initiation of standards formulation and researches under NR framework. At present, 3GPP has accomplished the work of formulation of requirements orienting 5G V2X services and has written it into standards TS22.886. 3GPP defines four use case groups for 5G V2X services, including Vehicles Platooning, Extended Sensors, Advanced Driving and Remote Driving. The technical research of NR V2X was approved at the 3GPP RAN #80 session.

SUMMARY

In order to meet requirements of new services, compared with LTE V2X systems, NR V2X services have higher throughput, higher reliability, lower latency, further transmission distance, more accurate positioning, higher variability in packet size and transmission periodicity, and key technical features coexisting with current 3GPP technologies and non-3GPP technologies more efficiently. The work mode of the present LTE V2X systems is limited to broadcast transmission only. According to common knowledges reached at the 3GPP RAN #80 plenary session, NR V2X will study a technical scheme supporting multiple work modes of unicast, groupcast and broadcast.

In the work mode of the present LTE Device to Device (D2D)/V2X, a radio signal transmitted through sidelink by a User Equipment (UE) is broadcast, and the radio signal is not directed to a specific UE. When there is a big-packet service directed to a specific UE, the work mode of broadcast transmission is very low in resource utilization, and cannot guarantee reliable transmission either. Therefore, it is needed to take unicast transmission into account in D2D and V2X under NR so as to improve spectrum efficiency and transmission performance.

In view of the above problems, the disclosure provides a solution to support unicast transmission. It should be noted that the embodiments of the UE of the disclosure and the characteristics in the embodiments may be applied to the base station if no conflict is incurred, and vice versa. The embodiments of the disclosure and the characteristics in the embodiments may be mutually combined arbitrarily if no conflict is incurred. Further, although the disclosure is initially designed for unicast based transmission mechanisms, the disclosure is also applicable to broadcast and groupcast transmissions. Furthermore, although the disclosure is initially designed for single-carrier communications, the disclosure is also applicable to multi-carrier communications.

The disclosure provides a method in a first node for wireless communication, wherein the method includes:
receiving a first radio signal, the first radio signal indicating a second index;
transmitting a first signaling; and
transmitting a second radio signal.
Herein, a first index and the second index are used for generating the first signaling and the second radio signal respectively; the first signaling is unrelated to the second index; and the first signaling includes configuration information for the second radio signal.

In one embodiment, the above method has the following benefits: the first index and the second index are used for generating the first signaling and the second radio signal respectively, that is to say, when a transmitting terminal in V2X transmits Sidelink Control Information (SCI), the SCI is related to an identifier of the transmitting terminal; while when a transmitting terminal in V2X transmits Physical Sidelink Shared Information (PSSCH), the PSSCH is related to an identifier of a receiving terminal; thus, through the first index, the transmitting terminal enables all V2X terminals in communication with the transmitting terminal to receive the SCI, meanwhile, through the second index, the transmitting terminal enables a particular terminal among all V2X terminals in communication with the transmitting terminal to receive the PSSCH, thereby simplifying the complexity of reception of the receiving terminal of PSSCH and achieving the property of unicast of data transmission.

In one embodiment, the above method has another benefit: compared with broadcast transmission, the above method avoids the behavior that all terminals in communication with the transmitting terminal need to detect the SCI and the PSSCH, thereby simplifying the complexity of the receiving terminal and improving the flexibility and efficiency of resource scheduling.

In one embodiment, the above method has yet another benefit: compared with the unicast transmission between a base station and a UE, the above method avoids the condition that the transmitting terminal schedules all UEs in communication with the transmitting terminal by playing a role of base station, thereby avoiding the occurrence of master and slave terminals in V2X and guaranteeing the safety and fairness of V2X transmission, and further avoiding the complexity of implementation caused by a constant change in master-slave relationship occurring when V2X pairing changes rapidly.

According to one aspect of the disclosure, the above method includes:
transmitting a second signaling.
Herein, the second signaling indicates the first index.

In one embodiment, the above method has the following benefits: the first node transmits the first index through a physical layer signaling, so that terminals in communication with the first node receive, through the first index, an SCI transmitted by the first node, thereby improving the performance of reception of SCI.

According to one aspect of the disclosure, the above method is characterized in that: the first signaling can be decoded by any terminal in a first terminal group, the first terminal group includes multiple terminals, a transmitter of the first radio signal is one of the multiple terminals, and the second radio signal can be correctly decoded by the transmitter of the first radio signal among the multiple terminals only.

In one embodiment, the above method has the following benefits: the first node receives the second index and generates the second radio signal through the second index, thereby guaranteeing that only the terminal transmitting the second index can correctly receive the second radio signal, avoiding the condition that other terminals receive the second radio signal, reducing the complexity of receiving terminals and avoiding problems of resource waste and low efficiency caused by broadcast.

According to one aspect of the disclosure, the above method includes:

detecting first information in each of K time window(s), the K being a positive integer.

Herein, the first information includes a Hybrid Automatic Repeat reQuest Acknowledgment (HARQ-ACK) associated to the second radio signal.

In one embodiment, the above method has the following benefits: data channels on sidelink are fed back through the first information, that is, a HARQ-ACK of the second radio signal, thus, transmission performance and spectrum efficiency on sidelink are improved.

According to one aspect of the disclosure, the above method is characterized in that: the first information can be detected by the first node only when the second radio signal is correctly decoded by the transmitter of the first radio signal.

In one embodiment, the above method has the following benefits: the essence of the above method is that the HARQ-ACK corresponding to the second radio signal employs an ACK-only mode, that is to say, a Non Acknowledgment (NACK) will not be transmitted due to an error reception of the second radio signal; when other UEs receive the first signaling in the disclosure, they cannot correctly receive the second radio signal for they cannot descramble the second index, thus the above method avoids the condition that the other UEs transmit unnecessary HARQ-ACKs for the second radio signal.

According to one aspect of the disclosure, the above method includes:

monitoring a third signaling.

When the third signaling is detected, the method includes: receiving a third radio signal Herein, the third signaling includes configuration information for the third radio signal, time-frequency resources indicated by the third signaling are overlapping with first time-frequency resources, time-frequency resources occupied by the third radio signal include the time-frequency resources indicated by the third signaling minus those overlapping with the first time-frequency resources; the first time-frequency resources are reserved for the first information; and the third signaling is unrelated to the second index.

In one embodiment, the above method has the following benefits: the third radio signal and the first information are transmitted in one same block of time-frequency resources, that is, they are transmitted in the time-frequency resources indicated by the third signaling simultaneously, which achieves a Piggyback transmission of HARQ-ACK and PSSCH, and further improves transmission performance.

In one embodiment, the above method has another benefit: the third radio signal is from a terminal other than a transmitting terminal of the first radio signal, thus PSSCHs transmitted by different terminals and a HARQ-ACK can employ a Piggyback transmission, thereby improving spectrum efficiency.

According to one aspect of the disclosure, the above method includes:

receiving a fourth radio signal, the fourth radio signal indicating a third index.

Herein, the third signaling is related to the third index, and a transmitter of the fourth radio signal is Quasi Co-located (QCLed) with a transmitter of the third signaling.

The disclosure provides a method in a second node for wireless communication, wherein the method includes:

transmitting a first radio signal, the first radio signal indicating a second index;

receiving a first signaling; and receiving a second radio signal.

Herein, a first index and the second index are used for generating the first signaling and the second radio signal respectively; the first signaling is unrelated to the second index; and the first signaling includes configuration information for the second radio signal.

According to one aspect of the disclosure, the above method includes:

receiving a second signaling.

Herein, the second signaling indicates the first index.

According to one aspect of the disclosure, the above method is characterized in that: the first signaling can be decoded by any terminal in a first terminal group, the first terminal group includes multiple terminals, a transmitter of the first radio signal is one of the multiple terminals, and the second radio signal can be correctly decoded by the transmitter of the first radio signal among the multiple terminals only.

According to one aspect of the disclosure, the above method includes:

transmitting first information in one or more of K time window(s), the K being a positive integer.

Herein, the first information includes a HARQ-ACK associated to the second radio signal.

According to one aspect of the disclosure, the above method is characterized in that: the first information can be detected by a transmitter of the second radio signal only when the second radio signal is correctly decoded by the second node.

The disclosure provides a method in a third node for wireless communication, wherein the method includes:

transmitting a third signaling; and transmitting a third radio signal.

Herein, the third signaling includes configuration information for the third radio signal, time-frequency resources indicated by the third signaling are overlapping with first time-frequency resources, time-frequency resources occupied by the third radio signal include the time-frequency resources indicated by the third signaling minus those overlapping with the first time-frequency resources; the first time-frequency resources are reserved for first information; the third signaling is unrelated to a second index; the first information includes a HARQ-ACK associated to a second radio signal; a receiver of the third signaling includes a first node, and the first node transmits the second radio signal.

According to one aspect of the disclosure, the above method includes:

transmitting a fourth radio signal, the fourth radio signal indicating a third index.

Herein, the third signaling is related to the third index.

The disclosure provides a first node for wireless communication, wherein the first node includes:

a first transceiver, to receive a first radio signal, the first radio signal indicating a second index;

a first transmitter, to transmit a first signaling; and a second transmitter, to transmit a second radio signal.

Herein, a first index and the second index are used for generating the first signaling and the second radio signal respectively; the first signaling is unrelated to the second index; and the first signaling includes configuration information for the second radio signal.

The disclosure provides a second node for wireless communication, wherein the second node includes:

a second transceiver, to transmit a first radio signal, the first radio signal indicating a second index;

a second receiver, to receive a first signaling; and a third receiver, to receive a second radio signal.

Herein, a first index and the second index are used for generating the first signaling and the second radio signal respectively; the first signaling is unrelated to the second index; and the first signaling includes configuration information for the second radio signal.

The disclosure provides a third node for wireless communication, wherein the third node includes:

a fourth transmitter, to transmit a third signaling; and a fifth transmitter, to transmit a third radio signal.

Herein, the third signaling includes configuration information for the third radio signal, time-frequency resources indicated by the third signaling are overlapping with first time-frequency resources, time-frequency resources occupied by the third radio signal include the time-frequency resources indicated by the third signaling minus those overlapping with the first time-frequency resources; the first time-frequency resources are reserved for first information; the third signaling is unrelated to a second index; the first information includes a HARQ-ACK associated to a second radio signal; a receiver of the third signaling includes a first node, and the first node transmits the second radio signal.

In one embodiment, compared with conventional schemes, the disclosure has the following advantages.

The first index and the second index are used for generating the first signaling and the second radio signal respectively, that is to say, when a transmitting terminal in V2X transmits Sidelink Control Information (SCI), the SCI is related to an identifier of the transmitting terminal; while when a transmitting terminal in V2X transmits Physical Sidelink Shared Information (PSSCH), the PSSCH is related to an identifier of a receiving terminal; thus, through the first index, the transmitting terminal enables all V2X terminals in communication with the transmitting terminal to receive the SCI, which keeps the same broadcast transmission as the SCI in existing D2D systems; meanwhile, through the second index, the transmitting terminal enables a particular terminal among all V2X terminals in communication with the transmitting terminal to receive the PSSCH, thereby simplifying the complexity of reception of the receiving terminal of PSSCH and achieving the property of unicast of data transmission.

Compared with broadcast transmission, the above method avoids the behavior that all terminals in communication with the transmitting terminal need to detect the SCI and the PSSCH, thereby simplifying the complexity of the receiving terminal and improving the flexibility and efficiency of resource scheduling; compared with the unicast transmission between a base station and a UE, the above method avoids the condition that the transmitting terminal schedules all UEs in communication with the transmitting terminal by playing a role of base station, thereby avoiding the occurrence of master and slave terminals in V2X and guaranteeing the safety and fairness of V2X transmission, and further avoiding the complexity of implementation caused by a constant change in master-slave relationship occurring when V2X pairing changes rapidly.

The second radio signal is scrambled with the second index transmitted by the second node, which guarantees that only the second node can correctly receive the second radio signal, avoids the condition that other terminals receive the second radio signal, reduces the complexity of the receiving terminals and avoids problems of resource waste and low efficiency caused by broadcast.

The first information and the third radio signal are transmitted in one same block of time-frequency resources, which achieves the feedback of HARQ-ACK on sidelink, improves spectrum efficiency and avoids the design of a separate channel only for information feedback.

The HARQ-ACK corresponding to the second radio signal employs an ACK-only mode; when other UEs receive the first signaling in the disclosure, they cannot correctly receive the second radio signal for they cannot descramble the second index, thus the above method avoids the condition that the other UEs transmit unnecessary HARQ-ACKs for the second radio signal.

BRIEF DESCRIPTION OF TH E DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be mutually combined arbitrarily if no conflict is incurred.

Embodiment 1

Figure 1:
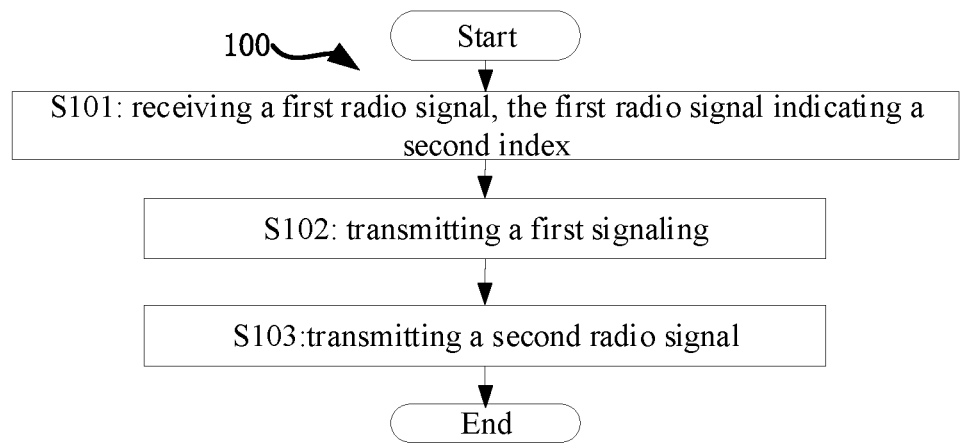
FIG. 1 is a flowchart of a first signaling according to one embodiment of the disclosure.

Embodiment 1 illustrates a flowchart of a first signaling, as shown in FIG. 1. In 100 shown in FIG. 1, each box represents one step.

In Embodiment 1, the first node in the disclosure receives a first radio signal in S101, the first radio signal indicating a second index, transmits a first signaling in S102, and transmits a second radio signal in S103; a first index and the second index are used for generating the first signaling and the second radio signal respectively; the first signaling is unrelated to the second index; and the first signaling includes configuration information for the second radio signal.

In one embodiment, the first signaling is an SCI.

In one embodiment, the first signaling is a physical layer signaling.

In one embodiment, a transmitter of the first radio signal is one terminal.

In one embodiment, the second radio signal is a PSSCH.

In one embodiment, the phrase that the first index is used for generating the first signaling includes: a CRC included in the first signaling is scrambled with the first index.

In one embodiment, the first index is a Cell-Radio Network Temporary Identifier (C-RNTI) specific to the first node.

In one embodiment, the first index is generated by the first node.

In one embodiment, the first index is assigned to the first node by a serving cell of the first node.

In one embodiment, the phrase that the second index is used for generating the second radio signal includes: the second radio signal is scrambled with the second index.

In one embodiment, the second index is assigned to a transmitter of the first radio signal by a serving cell of the transmitter of the first radio signal.

In one embodiment, the second index is generated by a transmitter of the first radio signal.

In one embodiment, the configuration information for the second radio signal includes: at least one of frequency domain resources occupied by the second radio signal, a Modulation and Coding Status (MCS) employed by the second radio signal, a Redundancy Version (RV) employed by the second radio signal and a HARQ process number employed by the second radio signal.

In one embodiment, a channel occupied by the first signaling includes a Physical Sidelink Control Channel (PSCCH).

In one embodiment, a channel occupied by the first radio signal includes a PSSCH.

In one embodiment, a channel occupied by the first radio signal includes at least one of a Primary Sidelink Synchronization Signal (PSSS) and a Secondary Sidelink Synchronization Signal (SSSS).

In one embodiment, a channel occupied by the first radio signal includes a Physical Sidelink Discovery Channel (PSDCH).

In one embodiment, a channel occupied by the first radio signal includes a Physical Sidelink Broadcasting Channel (PSBCH).

In one embodiment, a channel occupied by the second radio signal includes a PSSCH.

In one embodiment, the first signaling and the second radio signal are Frequency Division Multiplexing (FDM).

In one embodiment, the first node is one terminal.

In one embodiment, the first node is one UE.

In one embodiment, the first node is one car.

In one embodiment, the first node is one communication node in V2X.

Embodiment 2

Figure 2:
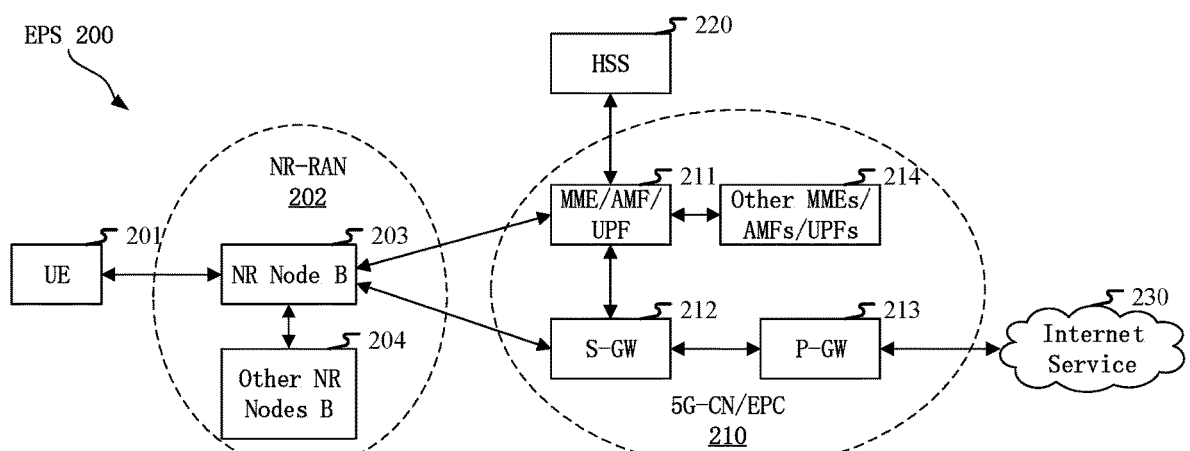
FIG. 2 is a diagram illustrating a network architecture according to one embodiment of the disclosure.

Embodiment 2 illustrates a diagram of a network architecture, as shown in FIG. 2.

Embodiment 2 illustrates a diagram of a network architecture according to the disclosure, as shown in FIG. 2. FIG. 2 is a diagram illustrating a network architecture 200 of NR 5G Long-Term Evolution (LTE) and Long-Term Evolution Advanced (LTE-A) systems. The NR 5G or LTE network architecture 200 may be called an Evolved Packet System (EPS) 200 or some other appropriate terms. The EPS 200 may include one or more UEs 201, a Next Generation-Radio Access Network (NG-RAN) 202, a 5G-Core Network/Evolved Packet Core (5G-CN/EPC) 210, a Home Subscriber Server (HSS) 220 and an Internet service 230. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or some other appropriate terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistants (PDAs), satellite radios, non-terrestrial base statin communications, satellite mobile communications, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5G-CN/EPC 210 via an S1/NG interface. The 5G-CN/EPC 210 includes a Mobility Management Entity/Authentication Management Field/User Plane Function (MME/AMF/UPF) 211, other MMEs/ AMFs/UPFs 214, a Service Gateway (S-GW) 212 and a Packet Data Network Gateway (P-GW) 213. The MME/ AMF/UPF 211 is a control node for processing a signaling between the UE 201 and the 5G-CN/EPC 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one embodiment, the UE 201 corresponds to the first node in the disclosure.

In one embodiment, the UE 201 corresponds to the second node in the disclosure.

In one embodiment, the UE 201 corresponds to the third node in the disclosure.

In one embodiment, the gNB 203 corresponds to the third node in the disclosure.

In one embodiment, the first node in the disclosure is the UE 201, and the second node in the disclosure is one terminal out the coverage of the gNB 203.

In one embodiment, the first node in the disclosure is the UE 201, and the third node in the disclosure is one terminal out the coverage of the gNB 203.

In one embodiment, the first node, the second node and the third node in the disclosure are all served by the gNB 203.

In one embodiment, the UE 201 supports transmission on multiple CCs simultaneously.

In one embodiment, the UE 201 supports transmission on multiple Bandwidth Parts (BWPs) simultaneously.

In one embodiment, the gNB 203 supports transmission on multiple CCs simultaneously.

In one embodiment, the gNB 203 supports transmission on multiple BWPs simultaneously.

Embodiment 3

Figure 3:
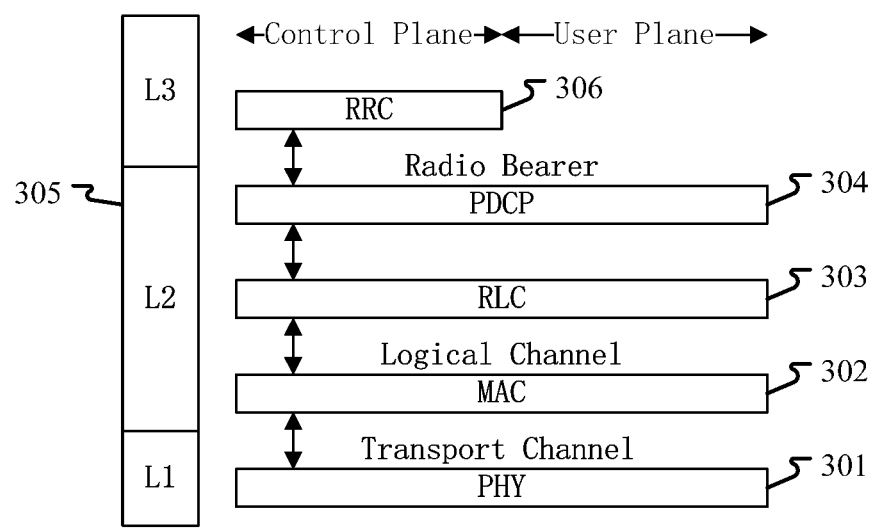
FIG. 3 is a diagram illustrating an embodiment of a radio protocol architecture of a user plane and a control plane according to one embodiment of the disclosure.

Embodiment 3 illustrates a diagram of an embodiment of a radio protocol architecture of a user plane and a control plane according to the disclosure, as shown in FIG. 3.

FIG. 3 is a diagram illustrating an embodiment of a radio protocol architecture of a user plane and a control plane. In FIG. 3, the radio protocol architecture of a UE and a base station (gNB or eNB) is illustrated by three layers, which are a Layer 1, a Layer 2 and a Layer 3 respectively. The Layer 1 (L1 layer) 301 is the lowest layer and implements various PHY (physical layer) signal processing functions. The L1 layer will be referred to herein as the PHY 301. The Layer 2 (L2 layer) 305 is above the PHY 301, and is responsible for the link between the UE and the gNB over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the gNB on the network side. Although not shown in FIG. 3, the UE may include several higher layers above the L2 layer 305, including a network layer (i.e. IP layer) terminated at the P-GW on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overheads. The PDCP sublayer 304 provides security by encrypting packets and provides support for UE handover between gNBs. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among UEs. The MAC sublayer 302 is also in charge of HARQ operations. In the control plane, the radio protocol architecture of the UE and the gNB is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the gNB and the UE.

In one embodiment, the radio protocol architecture shown in FIG. 3 is applicable to the first node in the disclosure.

In one embodiment, the radio protocol architecture shown in FIG. 3 is applicable to the second node in the disclosure.

In one embodiment, the radio protocol architecture shown in FIG. 3 is applicable to the third node in the disclosure.

In one embodiment, the radio protocol architecture shown in FIG. 3 is applicable to the base station in the disclosure.

In one embodiment, the first signaling in the disclosure is generated on the PHY 301.

In one embodiment, the second radio signal in the disclosure is generated on the MAC sublayer 302.

In one embodiment, the first radio signal in the disclosure is generated on the PHY 301.

In one embodiment, the second signaling in the disclosure is generated on the PHY 301.

In one embodiment, the first information in the disclosure is generated on the PHY 301.

In one embodiment, the third signaling in the disclosure is generated on the PHY 301.

In one embodiment, the third radio signal in the disclosure is generated on the MAC sublayer 302.

In one embodiment, the fourth radio signal in the disclosure is generated on the PHY 301.

In one embodiment, the K time windows in the disclosure are configured through the RRC sublayer 306.

Embodiment 4

Figure 4:
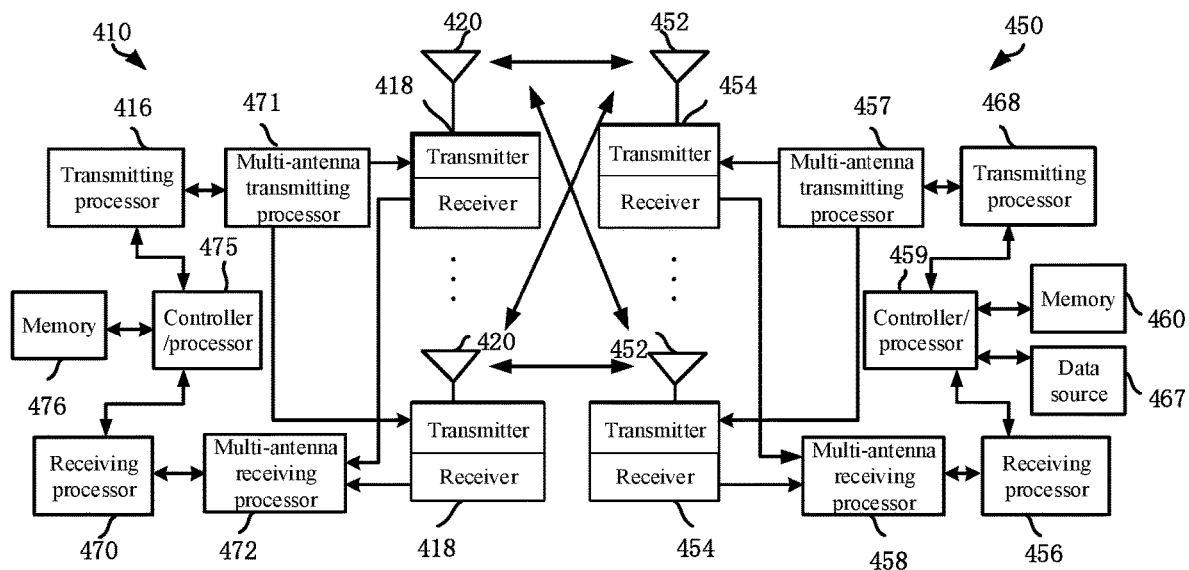
FIG. 4 is a diagram illustrating a first communication node and a second communication node according to one embodiment of the disclosure.

Embodiment 4 illustrates a diagram of a first communication equipment and a second communication equipment according to the disclosure, as shown in FIG. 4. FIG. 4 is a block diagram of a first communication equipment 450 and a second communication equipment 410 that are in communication with each other in an access network.

The first communication equipment 450 includes a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication equipment 410 includes a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication equipment 410 to the first communication equipment 450, at the second communication equipment 410, a higher-layer packet from a core network is provided to the controller/processor 475. The controller/processor 475 provides functions of Layer 2. In the transmission from the second communication equipment 410 to the first communication equipment 450, the controller/processor 475 provides header compression, encryption, packet segmentation and reordering, multiplexing between a logical channel and a transport channel, and a radio resource allocation for the first communication equipment 450 based on various priority metrics. The controller/processor 475 is also in charge of retransmission of lost packets, and signalings to the first communication equipment 450. The transmitting processor 416 and the multi-antenna transmitting processor 471 perform various signal processing functions used for Layer 1 (that is, PHY). The transmitting processor 416 performs encoding and interleaving so as to ensure FEC (Forward Error Correction) at the first communication equipment 450 and mappings to signal clusters corresponding to different modulation schemes (i.e., BPSK, QPSK, M-PSK M-QAM, etc.). The multi-antenna transmitting processor 471 processes the encoded and modulated symbols with digital spatial precoding (including precoding based on codebook and precoding based on non-codebook) and beamforming to generate one or more spatial streams. The transmitting processor 416 subsequently maps each spatial stream into a subcarrier to be multiplexed with a reference signal (i.e., pilot) in time domain and/or frequency domain, and then processes it with Inverse Fast Fourier Transform (IFFT) to generate a physical channel carrying time-domain multicarrier symbol streams. Then, the multi-antenna transmitting processor 471 processes the time-domain multicarrier symbol streams with transmitting analog precoding/beamforming. Each transmitter 418 converts a baseband multicarrier symbol stream provided by the multi-antenna transmitting processor 471 into a radio frequency stream and then provides it to different antennas 420.

In a transmission from the second communication equipment 410 to the first communication equipment 450, at the first communication equipment 450, each receiver 454 receives a signal via the corresponding antenna 452. Each receiver 454 recovers the information modulated to the RF carrier and converts the radio frequency stream into a baseband multicarrier symbol stream to provide to the receiving processor 456. The receiving processor 456 and the multi-antenna receiving processor 458 perform various signal processing functions of Layer 1. The multi-antenna receiving processor 458 processes the baseband multicarrier symbol stream coming from the receiver 454 with receiving analog precoding/beamforming. The receiving processor 458 converts the baseband multicarrier symbol stream subjected to the receiving analog precoding/beamforming operation from time domain into frequency domain using FFT (Fast Fourier Transform). In frequency domain, a physical layer data signal and a reference signal are demultiplexed by the receiving processor 456, wherein the reference signal is used for channel estimation, and the data signal is subjected to multi-antenna detection in the multi-antenna receiving processor 458 to recover any spatial stream targeting the UE 450. Symbols on each spatial stream are demodulated and recovered in the receiving processor 456 to generate a soft decision. Then, the receiving processor 456 decodes and de-interleaves the soft decision to recover the higher-layer data and control signal on the physical channel transmitted by the second communication equipment 410. Next, the higher-layer data and control signal are provided to the controller/processor 459. The controller/processor 459 performs functions of Layer 2. The controller/processor 459 may be connected to the memory 460 that stores program codes and data. The memory 460 may be called a computer readable media. In the transmission from the second communication equipment 410 to the first communication equipment 450, the controller/processor 459 provides multiplexing between the transport channel and the logical channel, packet reassembling, decryption, header decompression, and control signal processing so as to recover the higher-layer packet coming from the core network. The higher-layer packet is then provided to all protocol layers above Layer 2, or various control signals can be provided to Layer 3 for processing.

In a transmission from the first communication equipment 450 to the second communication equipment 410, at the first communication equipment 450, the data source 467 provides a higher-layer packet to the controller/processor 459. The data source 467 illustrates all protocol layers above the L2 layer. Similar as the transmitting function of the second communication equipment 410 described in the transmission from the second communication equipment 410 to the first communication equipment 450, the controller/processor 459 provides header compression, encryption, packet segmentation and reordering, and multiplexing between a logical channel and a transport channel based on radio resource allocation so as to provide the functions of L2 layer used for the control plane and user plane. The controller/processor 459 is also in charge of retransmission of lost packets, and signalings to the second communication equipment 410. The transmitting processor 468 conducts modulation mapping and channel encoding processing; the multi-antenna transmitting processor 457 performs digital multi-antenna spatial precoding (including precoding based on codebook and precoding based on non-codebook) and beaming processing; and subsequently, the transmitting processor 468 modulates the generated spatial streams into a multicarrier/single-carrier symbol stream, which is subjected to an analog precoding/beamforming operation in the multi-antenna transmitting processor 457 and then is provided to different antennas 452 via the transmitter 454. Each transmitter 452 first converts the baseband symbol stream provided by the multi-antenna transmitting processor 457 into a radio frequency symbol stream and then provides the radio frequency symbol stream to the antenna 452.

In a transmission from the first communication equipment 450 to the second communication equipment 410, the function of the second communication equipment 410 is similar as the receiving function of the first communication equipment 450 described in the transmission from second communication equipment 410 to the first communication equipment 450. Each receiver 418 receives a radio frequency signal via the corresponding antenna 420, converts the received radio frequency signal into a baseband signal, and provides the baseband signal to the multi-antenna receiving processor 472 and the receiving processor 470. The receiving processor 470 and the multi-antenna receiving processor 472 together provide functions of Layer 1. The controller/processor 475 provides functions of Layer 2. The controller/processor 475 may be connected to the memory 476 that stores program codes and data. The memory 476 may be called a computer readable media. In the transmission from the first communication equipment 450 to the second communication equipment 410, the controller/processor 475 provides de-multiplexing between the transport channel and the logical channel, packet reassembling, decryption, header decompression, and control signal processing so as to recover higher-layer packets coming from the UE 450. The higher-layer packet, coming from the controller/processor 475, may be provided to the core network.

In one embodiment, the first communication equipment 450 includes at least one processor and at least one memory. The at least one memory includes computer program codes. The at least one memory and the computer program codes are configured to be used in collaboration with the at least one processor. The first communication equipment 450 at least receives a first radio signal, the first radio signal indicating a second index, transmits a first signaling, and transmits a second radio signal; a first index and the second index are used for generating the first signaling and the second radio signal respectively; the first signaling is unrelated to the second index; and the first signaling includes configuration information for the second radio signal.

In one embodiment, the first communication equipment 450 includes a memory that stores a computer readable instruction program. The computer readable instruction program generates an action when executed by at least one processor. The action includes: receiving a first radio signal, the first radio signal indicating a second index, transmitting a first signaling, and transmitting a second radio signal; a first index and the second index are used for generating the first signaling and the second radio signal respectively; the first signaling is unrelated to the second index; and the first signaling includes configuration information for the second radio signal.

In one embodiment, the second communication equipment 410 includes at least one processor and at least one memory. The at least one memory includes computer program codes. The at least one memory and the computer program codes are configured to be used in collaboration with the at least one processor. The second communication equipment 410 at least transmits a first radio signal, the first radio signal indicating a second index, receives a first signaling, and receives a second radio signal; a first index and the second index are used for generating the first signaling and the second radio signal respectively; the first signaling is unrelated to the second index; and the first signaling includes configuration information for the second radio signal.

In one embodiment, the second communication equipment 410 includes a memory that stores a computer readable instruction program. The computer readable instruction program generates an action when executed by at least one processor. The action includes: transmitting a first radio signal, the first radio signal indicating a second index, receiving a first signaling, and receiving a second radio signal; a first index and the second index are used for generating the first signaling and the second radio signal respectively; the first signaling is unrelated to the second index; and the first signaling includes configuration information for the second radio signal.

In one embodiment, the second communication equipment 410 includes at least one processor and at least one memory. The at least one memory includes computer program codes. The at least one memory and the computer program codes are configured to be used in collaboration with the at least one processor. The second communication equipment 410 at least transmits a third signaling, and transmits a third radio signal; the third signaling includes configuration information for the third radio signal, time-frequency resources indicated by the third signaling are overlapping with first time-frequency resources, time-frequency resources occupied by the third radio signal include the time-frequency resources indicated by the third signaling minus those overlapping with the first time-frequency resources; the first time-frequency resources are reserved for first information; the third signaling is unrelated to a second index; the first information includes a HARQ-ACK associated to a second radio signal; a receiver of the third signaling includes a first node, and the first node transmits the second radio signal.

In one embodiment, the second communication equipment 410 includes a memory that stores a computer readable instruction program. The computer readable instruction program generates an action when executed by at least one processor. The action includes: transmitting a third signaling, and transmitting a third radio signal; the third signaling includes configuration information for the third radio signal, time-frequency resources indicated by the third signaling are overlapping with first time-frequency resources, time-frequency resources occupied by the third radio signal include the time-frequency resources indicated by the third signaling minus those overlapping with the first time-frequency resources; the first time-frequency resources are reserved for first information; the third signaling is unrelated to a second index; the first information includes a HARQ-ACK associated to a second radio signal; a receiver of the third signaling includes a first node, and the first node transmits the second radio signal.

In one embodiment, the first communication equipment 450 corresponds to the first node in the disclosure.

In one embodiment, the second communication equipment 410 corresponds to the second node in the disclosure.

In one embodiment, the second communication equipment 410 corresponds to the third node in the disclosure.

In one embodiment, at least one of the antenna 452, the receiver 454, the multiantenna receiving processor 458 or the receiving processor 456 is used for receiving the first radio signal in the disclosure; and at least one of the antenna 420, the transmitter 418, the multiantenna transmitting processor 471 or the transmitting processor 416 is used for transmitting the first radio signal in the disclosure.

In one embodiment, at least one of the antenna 452, the transmitter 454, the multiantenna transmitting processor 457 or the transmitting processor 468 is used for transmitting the first signaling in the disclosure; and at least one of the antenna 420, the receiver 418, the multiantenna receiving processor 472 or the receiving processor 470 is used for receiving the first signaling in the disclosure.

In one embodiment, at least one of the antenna 452, the transmitter 454, the multiantenna transmitting processor 457 or the transmitting processor 468 is used for transmitting the second radio signal in the disclosure; and at least one of the antenna 420, the receiver 418, the multiantenna receiving processor 472 or the receiving processor 470 is used for receiving the second radio signal in the disclosure.

In one embodiment, at least one of the antenna 452, the transmitter 454, the multiantenna transmitting processor 457 or the transmitting processor 468 is used for transmitting the second signaling in the disclosure; and at least one of the antenna 420, the receiver 418, the multiantenna receiving processor 472 or the receiving processor 470 is used for receiving the second signaling in the disclosure.

In one embodiment, at least one of the antenna 452, the receiver 454, the multiantenna receiving processor 458, the receiving processor 456 or the controller/processor 459 is used for detecting first information in each of the K time window(s) in the disclosure, the K being a positive integer;

and at least one of the antenna 420, the transmitter 418, the multiantenna transmitting processor 471, the transmitting processor 416 or the controller/processor 475 is used for transmitting first information in one or more of the K time window(s) in the disclosure, the K being a positive integer.

In one embodiment, at least one of the antenna 452, the receiver 454, the multiantenna receiving processor 458, the receiving processor 456 or the controller/processor 459 is used for monitoring a third signaling, and when the third signaling is detected, at least one of the antenna 452, the receiver 454, the multiantenna receiving processor 458, the receiving processor 456 or the controller/processor 459 is used for receiving the third radio signal in the disclosure; at least one of the antenna 420, the transmitter 418, the multiantenna transmitting processor 471, the transmitting processor 416 or the controller/processor 475 is used for transmitting the third signaling in the disclosure and the third radio signal in the disclosure.

In one embodiment, at least one of the antenna 452, the receiver 454, the multiantenna receiving processor 458, the receiving processor 456 or the controller/processor 459 is used for receiving the fourth radio signal in the disclosure; and at least one of the antenna 420, the transmitter 418, the multiantenna transmitting processor 471, the transmitting processor 416 or the controller/processor 475 is used for transmitting the fourth radio signal in the disclosure.

Embodiment 5

Figure 5:
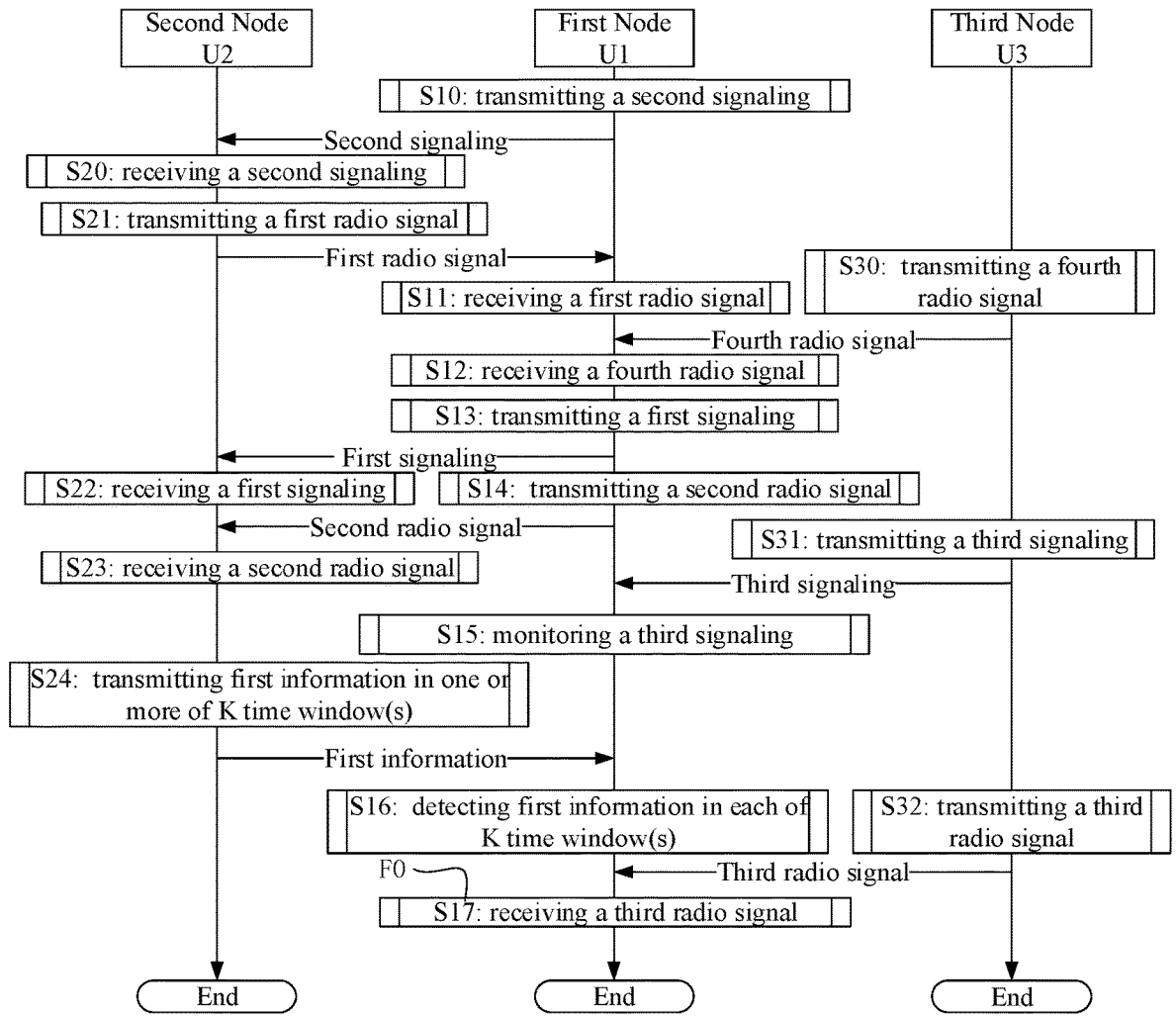
FIG. 5 is a flowchart of a first radio signal according to one embodiment of the disclosure.

Embodiment 5 illustrates a flowchart of a first radio signal, as shown in FIG. 5. In FIG. 5, a first node U1 and a second node U2 perform communication through a sidelink, and the first node U1 and a third node U3 perform communication through a sidelink. Steps in F0 in FIG. 5 are optional.

The first node U1 transmits a second signaling in S10, receives a first radio signal in S11, the first radio signal indicating a second index, receives a fourth radio signal in S12, the fourth radio signal indicating a third index, transmits a first signaling in S13, transmits a second radio signal in S14, monitors a third signaling in S15, detects first information in each of K time window(s) in S16, the K being a positive integer, and receives a third radio signal in S17.

The second node U2 receives a second signaling in S20, transmits a first radio signal in S21, the first radio signal indicating a second index, receives a first signaling in S22, receives a second radio signal in S23, and transmits first information in one or more of K time window(s) in S24, the K being a positive integer.

The third node U3 transmits a fourth radio signal in S30, the fourth radio signal indicating a third index, transmits a third signaling in S31, and transmits a third radio signal in S32.

In Embodiment 5, a first index and the second index are used for generating the first signaling and the second radio signal respectively; the first signaling is unrelated to the second index; the first signaling includes configuration information for the second radio signal; the second signaling indicates the first index; the first signaling can be decoded by any terminal in a first terminal group, the first terminal group includes multiple terminals, the second node U2 is one of the multiple terminals, and the second radio signal can be correctly decoded by the second node U2 among the multiple terminals only; the first information includes a HARQ-ACK associated to the second radio signal; the first information can be detected by the first node U1 only when the second radio signal is correctly decoded by the second node U2; the third signaling is detected by the first node U1; the third signaling includes configuration information for the third radio signal, time-frequency resources indicated by the third signaling are overlapping with first time-frequency resources, time-frequency resources occupied by the third radio signal include the time-frequency resources indicated by the third signaling minus those overlapping with the first time-frequency resources; the first time-frequency resources are reserved for the first information; the third signaling is unrelated to the second index; the third signaling is related to the third index; a transmitter of the fourth radio signal and a transmitter of the third signaling are both the third node U3.

In one embodiment, a channel occupied by the second signaling includes a PSBCH.

In one embodiment, a channel occupied by the second signaling includes a PSCCH.

In one embodiment, a channel occupied by the second signaling includes a Physical Sidelink Discovery Information (PSDCH).

In one embodiment, a channel occupied by the second signaling includes a PSBCH and a PSCCH.

In one embodiment, a channel occupied by the second signaling includes a PSBCH and a PSDCH.

In one embodiment, the phrase that the second radio signal can be correctly decoded by the second node U2 among the multiple terminals only includes: the second node U2 descrambles the second radio signal through the second index.

In one embodiment, each terminal in the first terminal group performs channel decoding of the second radio signal.

In one embodiment, the first signaling is used for indicating the K time window(s).

In one embodiment, the K time window(s) is(are) configured by a semi-static signaling.

In one embodiment, the K time window(s) is(are) configured by a higher layer signaling.

In one embodiment, a time-domain position of each time window among the K time window(s) is related to time domain resources occupied by the second radio signal.

In one embodiment, the K is 1.

In one embodiment, the K is greater than 1.

In one embodiment, the first node U1 determines whether the first information is transmitted, through detecting a Cyclic Redundancy Check (CRC).

In one embodiment, the first node U1 determines whether the first information is transmitted, through detecting a demodulation reference signal.

In one embodiment, the first node U1 assumes that the first information can be transmitted in at most one of the K time window(s) only.

In one embodiment, the second index is used for generating the first information.

In one embodiment, a channel occupied by the first information includes a PSSCH.

In one embodiment, a channel occupied by the first information includes a PSCCH.

In one embodiment, the first information is transmitted in one of the K time window(s).

In one embodiment, the first information is transmitted in each of the K time window(s).

In one embodiment, the phrase that the first information can be detected by the first node U1 only when the second radio signal is correctly decoded by the second node U2 includes: when the second radio signal is correctly decoded by the second node U2, the second node U2 transmits the first information.

In one embodiment, the phrase that the first information can be detected by the first node U1 only when the second radio signal is correctly decoded by the second node U2 includes: when the second radio signal is not correctly decoded by the second node U2, the second node U2 does not transmit the first information.

In one embodiment, the configuration information for the third radio signal includes: frequency domain resources occupied by the third radio signal, an MCS employed by the third radio signal, an RV employed by the third radio signal and a HARQ process number employed by the third radio signal.

In one embodiment, the third node U3 and the second node U2 are Non Quasi Co-located (Non QCLed).

In one embodiment, the third node U3 and the second node U2 are two different terminals.

In one embodiment, the phrase that the two transmitters in the disclosure are Non QCLed refers that: all or partial large-scale properties of a radio signal transmitted by one of the two transmitters cannot be deduced from all or partial large-scale properties of a radio signal transmitted by the other one of the two transmitters; the large-scale properties include one or more of delay spread, Doppler spread, Doppler shift, path loss or average gain.

In one embodiment, the phrase that the two transmitters in the disclosure are QCLed refers that: all or partial large-scale properties of a radio signal transmitted by one of the two transmitters can be deduced from all or partial large-scale properties of a radio signal transmitted by the other one of the two transmitters; the large-scale properties include one or more of delay spread, Doppler spread, Doppler shift, path loss or average gain.

In one embodiment, the first time-frequency resources include K time-frequency sub-resources, the K time-frequency sub-resources belong to K time windows respectively, and the first node U1 monitors the first information in each of the K time-frequency sub-resources respectively.

In one embodiment, time-frequency resources indicated by the third signaling and the first time-frequency resources include multiple Resource Elements (REs) respectively; and at least one RE belongs to the time-frequency resources indicated by the third signaling and the first time-frequency resources simultaneously.

In one embodiment, the phrase that the time-frequency resources indicated by the third signaling are overlapping with the first time-frequency resources include: at least one RE belongs to the time-frequency resources indicated by the third signaling and the first time-frequency resources simultaneously.

In one embodiment, the first time-frequency resources belong to a first time window in time domain.

In one embodiment, the phrase that the first time-frequency resources are reserved for the first information includes: the first node U1 monitors the first information in the first time-frequency resources.

In one embodiment, the phrase that the first time-frequency resources are reserved for the first information includes: the first signaling is used for determining the first time-frequency resources.

In one embodiment, the phrase that the first time-frequency resources are reserved for the first information includes: the first signaling is used for indicating the first time-frequency resources.

In one embodiment, the phrase that the first time-frequency resources are reserved for the first information includes: the second signaling is used for determining the first time-frequency resources.

In one embodiment, the phrase that the first time-frequency resources are reserved for the first information includes: the first signaling indicates the first time-frequency resources.

In one embodiment, the phrase that the first time-frequency resources are reserved for the first information includes: the second signaling indicates the first time-frequency resources.

In one embodiment, the phrase that the first time-frequency resources are reserved for the first information includes: the first time-frequency resources are configured by the first node U1.

In one embodiment, the first node U1 monitors the third signaling through blind decoding.

In one embodiment, the first node U detects the third signaling in each one of multiple RE sets, and each one of the multiple RE sets includes multiple REs.

In one embodiment, the third signaling is transmitted on a PSCCH.

In one embodiment, a channel occupied by the third signaling includes a PSCCH.

In one embodiment, the third signaling is an SCI.

In one embodiment, the first node U1 determines whether the third signaling is transmitted, through detecting an CRC.

In one embodiment, the first node U1 determines whether the third signaling is transmitted, through detecting a demodulation reference signal.

In one embodiment, time-domain resources occupied by the third radio signal belong to one of the K time window(s).

In one embodiment, time-domain resources occupied by the third signaling and time-domain resources occupied by the third radio signal belong to one same time window among the K time window(s).

In one embodiment, time-domain resources occupied by the third radio signal are overlapping with at least two of the K time windows.

In one embodiment, the third signaling and the third radio signal are FDM.

In one embodiment, the first index is used for generating the third radio signal.

In one embodiment, the third radio signal is scrambled with the first index.

In one embodiment, the first node U1 does not correctly receive the third signaling in S15, and the first node U1 gives up receiving the third radio signal in S17.

Embodiment 6

Figure 6:
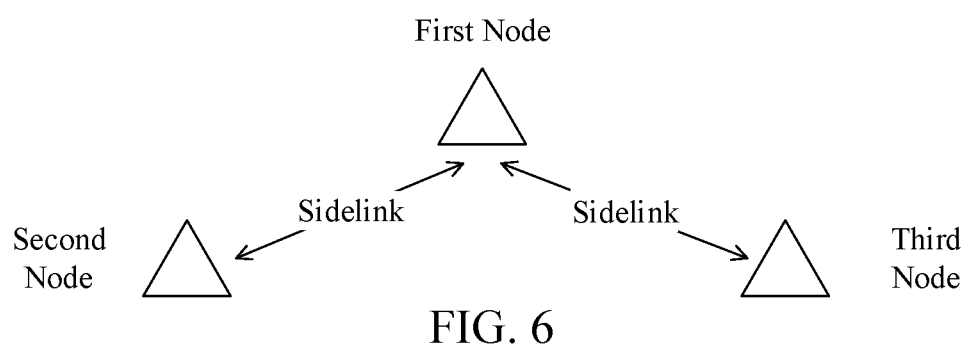
FIG. 6 is a diagram illustrating a first node, a second node and a third node according to one embodiment of the disclosure.

Embodiment 6 illustrates a diagram of a first node, a second node and a third node, as shown in FIG. 6. In FIG. 6, the first node, the second node and the third node are all terminal equipment. The first node and the second node perform communication on a sidelink, the first node and the third node perform communication on a sidelink.

In one embodiment, the first node is a group head of the second node and the third node.

In one embodiment, the first node and the second node are served under one same base station.

In one embodiment, the third node and the first node are served by different base stations respectively.

In one embodiment, at least one of the first node, the second node and the third node is a vehicle.

In one embodiment, the first node, the second node and the third node are all vehicles.

Embodiment 7

Embodiment 7 illustrates a diagram of a first signaling, a second radio signal and a third radio signal, as shown in FIG.

Figure 7:
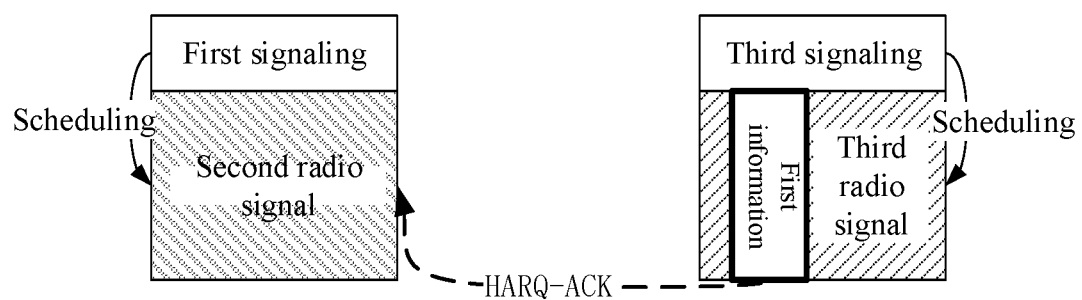
FIG. 7 is a diagram illustrating a first signaling, a second radio signal and a third radio signal according to one embodiment of the disclosure.

7. In FIG. 7, the first signaling is used for scheduling the second radio signal, the third signaling in the disclosure is used for scheduling the third radio signal, the first time-frequency resources in the disclosure are reserved for the first information, the first time-frequency resources are overlapping with time-frequency resources indicated by the third signaling, and the first information includes a HARQ-ACK associated to the second radio signal.

In one embodiment, the first signaling and the second radio signal are FDM.

In one embodiment, the first signaling and the second radio signal are Time Division Multiplexing (TDM).

In one embodiment, the third signaling and the third radio signal are FDM.

In one embodiment, the third signaling and the third radio signal are TDM.

In one embodiment, all REs occupied by the first time-frequency resources all belong to time-frequency resources indicated by the third signaling.

In one embodiment, the first information is transmitted in time-frequency resources indicated by the third signaling through puncturing.

Embodiment 8

Figure 8:
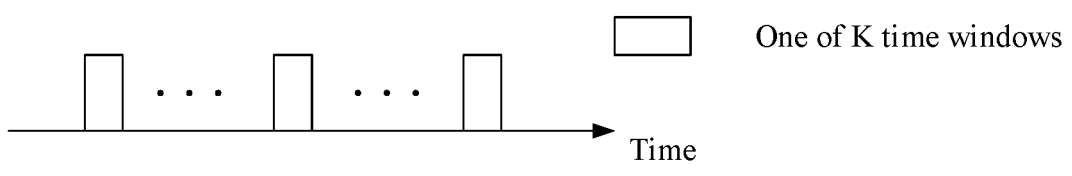
FIG. 8 is a diagram illustrating K time windows according to one embodiment of the disclosure.

Embodiment 8 illustrates a diagram of K time windows, as shown in FIG. 8. In FIG. 8, the K time windows are discrete in time domain.

In one embodiment, the K time windows are distributed at equal intervals in time domain.

In one embodiment, any one of the K time windows has a duration of 1 ms in time domain.

In one embodiment, a position of any one of the K time windows in time domain is configured through a higher layer signaling, and the higher layer signaling comes from a base station of a serving cell of the first node in the disclosure.

In one embodiment, a position of any one of the K time windows in time domain is indicated to the second node in the disclosure through the first signaling.

In one embodiment, a position of any one of the K time windows in time domain is predefined.

Embodiment 9

Figure 9:
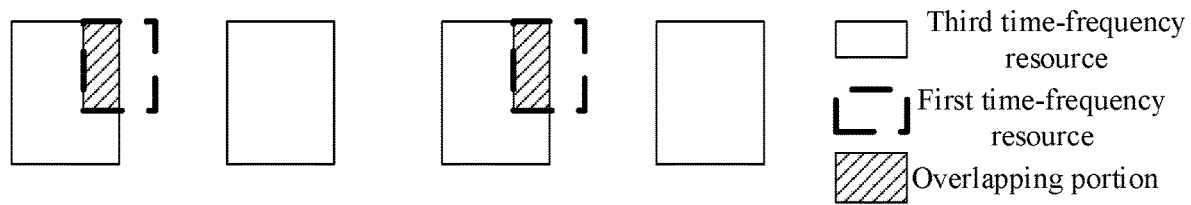
FIG. 9 is a diagram illustrating first time-frequency resources according to one embodiment of the disclosure.

Embodiment 9 illustrates a diagram of first time-frequency resources, as shown in FIG. 9. In FIG. 9, the first time-frequency resources include K time-frequency sub-resources, at least one of the K time-frequency sub-resources is overlapping with third time-frequency resources, and the third time-frequency resources are the time-frequency resources indicated by the third signaling in the disclosure.

In one embodiment, the third time-frequency resources include K1 candidate time-frequency sub-resources, the K1 is a positive integer, K2 candidate time-frequency sub-resources among the K1 candidate time-frequency sub-resources are overlapping with K2 time-frequency sub-resources among the K time-frequency sub-resources; and the K2 is a positive integer not greater than the K1.

In one embodiment, the third radio signal avoids occupying those REs in the third time-frequency resources overlapping with the K time-frequency sub-resources through puncturing.

In one embodiment, the third radio signal avoids occupying those REs in the third time-frequency resources overlapping with the K time-frequency sub-resources through rate matching.

Embodiment 10

Figure 10:
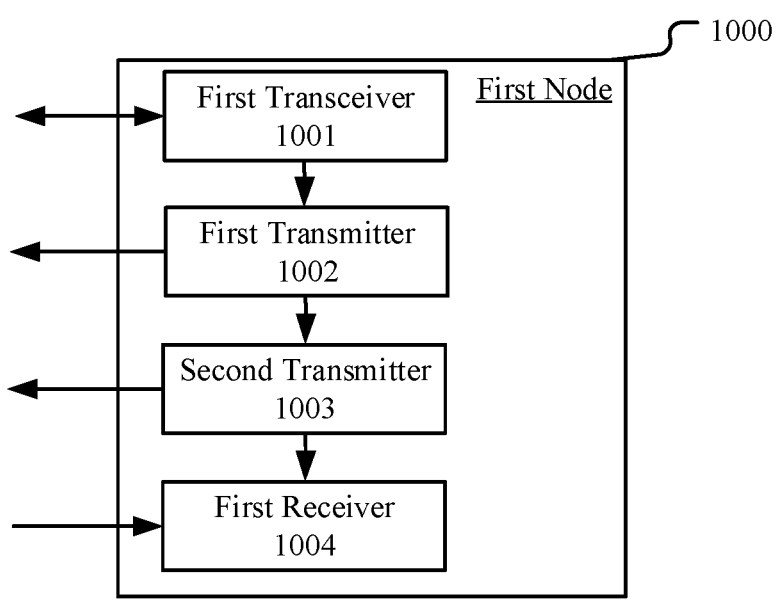
FIG. 10 is a structure block diagram illustrating a processing device in a first node according to one embodiment of the disclosure.

Embodiment 10 illustrates a structure block diagram of a processing device in a first node, as shown in FIG. 10. In FIG. 10, the processing device 1000 in the first node includes a first transceiver 1001, a first transmitter 1002, a second transmitter 1003 and a first receiver 1004.

The first transceiver 1001 receives a first radio signal, the first radio signal indicating a second index.

The first transmitter 1002 transmits a first signaling.

The second transmitter 1003 transmits a second radio signal.

The first receiver 1004 detects first information in each of K time window(s), the K being a positive integer.

In Embodiment 16, a first index and the second index are used for generating the first signaling and the second radio signal respectively; the first signaling is unrelated to the second index; the first signaling includes configuration information for the second radio signal; and the first information includes a HARQ-ACK associated to the second radio signal.

In one embodiment, the first transceiver 1001 further transmits a second signaling; and the second signaling indicates the first index.

In one embodiment, the first signaling can be decoded by any terminal in a first terminal group, the first terminal group includes multiple terminals, a transmitter of the first radio signal is one of the multiple terminals, and the second radio signal can be correctly decoded by the transmitter of the first radio signal among the multiple terminals only.

In one embodiment, the first information can be detected by the first node only when the second radio signal is correctly decoded by the transmitter of the first radio signal.

In one embodiment, the first receiver 1004 further monitors a third signaling; when the third signaling is detected, the first receiver 1004 further receives a third radio signal; the third signaling includes configuration information for the third radio signal, time-frequency resources indicated by the third signaling are overlapping with first time-frequency resources, time-frequency resources occupied by the third radio signal include the time-frequency resources indicated by the third signaling minus those overlapping with the first time-frequency resources; the first time-frequency resources are reserved for the first information; and the third signaling is unrelated to the second index.

In one embodiment, the first transceiver 1001 further receives a fourth radio signal, and the fourth radio signal indicates a third index; and the third signaling is related to the third index, and a transmitter of the fourth radio signal is QCLed with a transmitter of the third signaling.

In one embodiment, the first transceiver 1001 includes at least the former six of the antenna 452, the receiver/transmitter 454, the multiantenna receiving processor 458, the multiantenna transmitting processor 457, the receiving processor 456, the transmitting processor 468 and the controller/processor 459 illustrated in Embodiment 4.

In one embodiment, the first transmitter 1002 includes at least the former four of the antenna 452, the transmitter 454, the multiantenna transmitting processor 457, the transmitting processor 468 and the controller/processor 459 illustrated in Embodiment 4.

In one embodiment, the second transmitter 1003 includes at least the former four of the antenna 452, the transmitter 454, the multiantenna transmitting processor 457, the transmitting processor 468 and the controller/processor 459 illustrated in Embodiment 4.

In one embodiment, the first receiver 1004 includes at least the former four of the antenna 452, the receiver 454, the multiantenna receiving processor 458, the receiving processor 456 and the controller/processor 459 illustrated in Embodiment 4.

Embodiment 11

Figure 11:
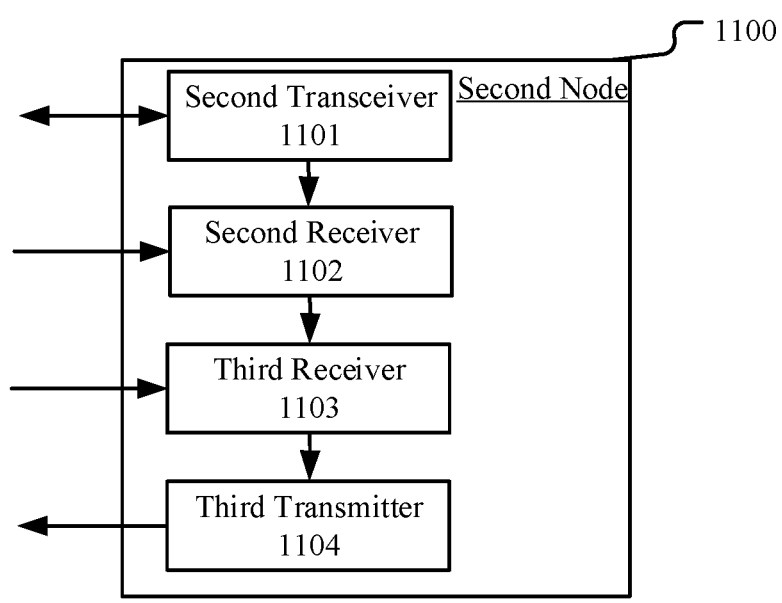
FIG. 11 is a structure block diagram illustrating a processing device in a second node according to one embodiment of the disclosure.

Embodiment 11 illustrates a structure block diagram of a processing device in a second node, as shown in FIG. 11. In FIG. 11, the processing device 1100 in the second node includes a second transceiver 1101, a second receiver 1102, a third receiver 1103 and a third transmitter 1104.

The second transceiver 1101 transmits a first radio signal, the first radio signal indicating a second index.

The second receiver 1102 receives a first signaling.

The third receiver 1103 receives a second radio signal.

The third transmitter 1104 transmits first information in one or more of K time window(s), the K being a positive integer.

In Embodiment 11, a first index and the second index are used for generating the first signaling and the second radio signal respectively; the first signaling is unrelated to the second index; the first signaling includes configuration information for the second radio signal; and the first information includes a HARQ-ACK associated to the second radio signal.

In one embodiment, the second transceiver 1101 further receives a second signaling; and the second signaling indicates the first index.

In one embodiment, the first signaling can be decoded by any terminal in a first terminal group, the first terminal group includes multiple terminals, the second node is one of the multiple terminals, and the second radio signal can be correctly decoded by the second node among the multiple terminals only.

In one embodiment, the first information can be detected by a transmitter of the second radio signal only when the second radio signal is correctly decoded by the second node.

In one embodiment, the second transceiver 1101 includes at least the former six of the antenna 420, the transmitter/receiver 418, the multiantenna transmitting processor 471, the multiantenna receiving processor 472, the transmitting processor 416, the receiving processor 470 and the controller/processor 475 illustrated in Embodiment 4.

In one embodiment, the second receiver 1102 includes at least the former four of the antenna 420, the receiver 418, the multiantenna receiving processor 472, the receiving processor 470 and the controller/processor 475 illustrated in Embodiment 4.

In one embodiment, the third receiver 1103 includes at least the former four of the antenna 420, the receiver 418, the multiantenna receiving processor 472, the receiving processor 470 and the controller/processor 475 illustrated in Embodiment 4.

In one embodiment, the third transmitter 1104 includes at least the former four of the antenna 420, the transmitter 418, the multiantenna transmitting processor 471, the transmitting processor 416 and the controller/processor 475 illustrated in Embodiment 4.

Embodiment 12

Figure 12:
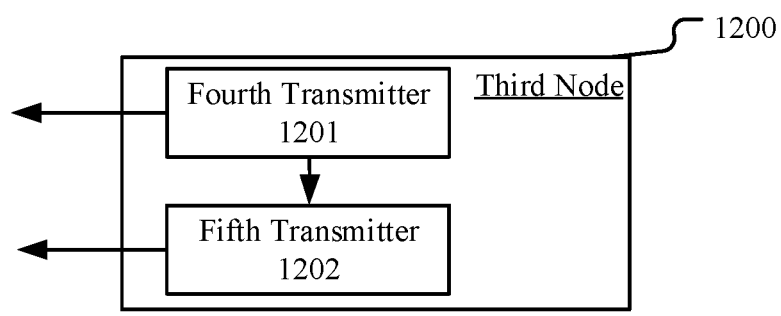
FIG. 12 is a structure block diagram illustrating a processing device in a third node according to one embodiment of the disclosure.

Embodiment 12 illustrates a structure block diagram of a processing device in a third node, as shown in FIG. 12. In FIG. 12, the processing device 1200 in the third node includes a fourth transmitter 1201 and a fifth transmitter 1202.

The fourth transmitter 1201 transmit a third signaling.

The fifth transmitter 1202 transmits a third radio signal.

In Embodiment 12, the third signaling includes configuration information for the third radio signal, time-frequency resources indicated by the third signaling are overlapping with first time-frequency resources, time-frequency resources occupied by the third radio signal include the time-frequency resources indicated by the third signaling minus those overlapping with the first time-frequency resources; the first time-frequency resources are reserved for first information; the third signaling is unrelated to a second index; the first information includes a HARQ-ACK associated to a second radio signal; a receiver of the third signaling includes a first node, and the first node transmits the second radio signal.

In one embodiment, the fourth transmitter further transmits a fourth radio signal, and the fourth radio signal indicates a third index; and the third signaling is related to the third index.

In one embodiment, the fourth transmitter 1201 includes at least the former four of the antenna 420, the transmitter 418, the multiantenna transmitting processor 471, the transmitting processor 416 and the controller/processor 475 illustrated in Embodiment 4.

In one embodiment, the fifth transmitter 1202 includes at least the former four of the antenna 420, the transmitter 418, the multiantenna transmitting processor 471, the transmitting processor 416 and the controller/processor 475 illustrated in Embodiment 4.

The ordinary skill in the art may understand that all or part of the steps in the above method may be implemented by instructing related hardware through a program. The program may be stored in a computer readable storage medium, for example Read-Only Memory (ROM), hard disk or compact disc, etc. Optionally, all or part of the steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The first node in the disclosure includes but is not limited to mobile phones, tablet computers, notebooks, network cards, low-power equipment, enhanced MTC (eMTC) terminals, NB-IoT terminals, vehicle-mounted communication equipment, aircrafts, airplanes, unmanned aerial vehicles, telecontrolled aircrafts, and other radio communication equipment. The second node in the disclosure includes but is not limited to mobile phones, tablet computers, notebooks, network cards, low-power equipment, eMTC terminals, NB-IoT terminals, vehicle-mounted communication equipment, aircrafts, airplanes, unmanned aerial vehicles, telecontrolled aircrafts, and other radio communication equipment. The UE or terminal in the disclosure includes but is not limited to mobile phones, tablet computers, notebooks, network cards, low-power equipment, eMTC terminals, NB-IoT terminals, vehicle-mounted communication equipment, aircrafts, airplanes, unmanned aerial vehicles, telecontrolled aircrafts, and other radio communication equipment. The base station or network side equipment in the disclosure includes but is not limited to macro-cellular base stations, micro-cellular base stations, home base stations, relay base stations, eNBs, gNBs, TRPs, GNSSs, relay satellites, satellite base stations, air base stations, and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a first node for wireless communication, the method comprising:
   receiving a first radio signal from a second node, the first radio signal indicating a second index;
   transmitting a first signaling to the second node after receiving the first radio signal;
   transmitting a second radio signal to the second node;
   monitoring a third signaling from a third node; and
   when the third signaling is detected, receiving a third radio signal from the third node,
   wherein:
      a first index is an identifier of the first node, and the second index is an identifier of the second node;
      the first index and the second index are used for generating the first signaling and the second radio signal, respectively;
      the first signaling comprises configuration information for the second radio signal;
      the second node is a user equipment (UE);
      a channel occupied by the first signaling includes a physical sidelink control channel (PSCCH);
      a channel occupied by the first radio signal includes a physical sidelink shared channel;
      the configuration information included in the first signaling for the second radio signal includes frequency domain resources occupied by the second radio signal and a modulation and coding status (MCS) employed by the second radio signal;
      the third signaling includes configuration information for the third radio signal;
      time-frequency resources indicated by the third signaling overlap with first time-frequency resources;
      time-frequency resources occupied by the third radio signal include the time-frequency resources indicated by the third signaling minus those overlapping with the first time-frequency resources;
      the first time-frequency resources are reserved for first information; and
      the third signaling is unrelated to the second index.

2. The method according to claim 1, further comprising transmitting a second signaling that indicates the first index.

3. The method according to claim 1, wherein the first signaling can be decoded by any terminal in a first terminal group, the first terminal group comprises multiple terminals, a transmitter of the first radio signal is one of the multiple terminals, and the second radio signal can only be correctly decoded by the transmitter of the first radio signal among the multiple terminals.

4. The method according to claim 1, further comprising:
   detecting the first information in each of one or more time windows;
   wherein the first information comprises a hybrid automatic repeat request acknowledgment (HARQ-ACK) associated with the second radio signal.

5. The method according to claim 4, wherein:
   a receiver of the second radio signal comprises the second node;
   when the second radio signal is correctly decoded by the second node, the second node transmits the first information; and
   when the second radio signal is not correctly decoded by the second node, the second node does not transmit the first information.

6. The method according to claim 1, wherein:
   a cyclic redundancy check (CRC) included in the first signaling is scrambled with the first index;
   the configuration information for the second radio signal further includes a redundancy version employed by the second radio signal and a hybrid automatic repeat request (HARQ) process number employed by the second radio signal; and
   the second radio signal is physical sidelink shared information (PSSCH).

7. A first node for wireless communication, the first node comprising:
   a first transceiver to receive a first radio signal from a second node, the first radio signal indicating a second index;
   a first transmitter to transmit a first signaling to the second node after a reception of the first radio signal; and
   a second transmitter to transmit a second radio signal to the second node; and
   a first receiver to monitor a third signaling from a third node, and when the third signaling is detected, the first receiver to receive a third radio signal from the third node,
   wherein:
      a first index is an identifier of the first node, and the second index is an identifier of the second node;
      the first index and the second index are used for generating the first signaling and the second radio signal, respectively; and
      the first signaling comprises configuration information for the second radio signal;
      the second node is a user equipment (UE);
      a channel occupied by the first signaling includes a physical sidelink control channel (PSCCH);
      a channel occupied by the first radio signal includes a physical sidelink shared channel;
      the configuration information included in the first signaling for the second radio signal includes: frequency domain resources occupied by the second radio signal and a modulation and coding status (MCS) employed by the second radio signal;
      the third signaling includes configuration information for the third radio signal;
      time-frequency resources indicated by the third signaling overlap with first time-frequency resources;
      time-frequency resources occupied by the third radio signal include the time-frequency resources indicated by the third signaling minus those overlapping with the first time-frequency resources;
      the first time-frequency resources are reserved for first information; and
      the third signaling is unrelated to the second index.

8. The first node according to claim 7, wherein the first transceiver transmits a second signaling that indicates the first index.

9. The first node according to claim 7, wherein the first signaling can be decoded by any terminal in a first terminal group, the first terminal group comprises multiple terminals, a transmitter of the first radio signal is one of the multiple terminals, and the second radio signal can only be correctly decoded by the transmitter of the first radio signal among the multiple terminals.

10. The first node according to claim 7, wherein the first receiver to further detect first information in each of one or more time windows, wherein the first information comprises a hybrid automatic repeat request acknowledgment (HARQ-ACK) associated with the second radio signal.

11. The first node according to claim 10, wherein:
a receiver of the second radio signal comprises the second node;
when the second radio signal is correctly decoded by the second node, the second node transmits the first information; and
when the second radio signal is not correctly decoded by the second node, the second node does not transmit the first information.

12. The first node according to claim 7, wherein:
a cyclic redundancy check (CRC) included in the first signaling is scrambled with the first index;
the configuration information for the second radio signal further includes a redundancy version employed by the second radio signal and a hybrid automatic repeat request (HARQ) process number employed by the second radio signal; and
the second radio signal is physical sidelink shared information (PSSCH).

* * * * *